United States Patent [19]

Duttweiler et al.

[11] Patent Number: 5,668,865

[45] Date of Patent: Sep. 16, 1997

[54] ECHO CANCELER E-SIDE SPEECH DETECTOR

[75] Inventors: Donald Lars Duttweiler, Rumson; Cheng Kim, Lincroft; Ying Get Tao, Manalapan, all of N.J.

[73] Assignee: Lucent Technologies Inc., Murray Hill, N.J.

[21] Appl. No.: 606,934

[22] Filed: Feb. 26, 1996

[51] Int. Cl.$^6$ .................. H04B 3/23; H04B 3/20
[52] U.S. Cl. .............. 379/410; 379/406; 370/286; 370/290
[58] Field of Search .................. 379/410, 406, 379/411, 409, 389; 370/32.1, 286, 289, 290; 395/2.35, 2.36, 2.37

[56] References Cited

U.S. PATENT DOCUMENTS

| | | | |
|---|---|---|---|
| 4,029,912 | 6/1977 | Geigel et al. | 379/406 |
| 4,129,753 | 12/1978 | Duttweiler | 379/410 |
| 4,363,938 | 12/1982 | Daaboul et al. | 379/410 |
| 4,382,164 | 5/1983 | May et al. | 379/410 |
| 4,562,312 | 12/1985 | Duttweiler | 379/410 |
| 4,591,669 | 5/1986 | Duttweiler et al. | 370/410 |
| 4,998,241 | 3/1991 | Brox et al. | 370/32.1 |
| 5,343,521 | 8/1994 | Jullien et al. | 379/410 |
| 5,418,848 | 5/1995 | Armbruster | 379/406 |
| 5,502,716 | 3/1996 | Rhebergen | 370/27 |
| 5,528,687 | 6/1996 | Tanaka et al. | 379/406 |

OTHER PUBLICATIONS

"A Twelve-Channel Digital Echo Canceler", D. L. Duttweiler, *IEEE Transactions on Communications*, vol. COM-26, No. 5, May 1978, pp. 647-653.

*Primary Examiner*—Thomas W. Brown
*Assistant Examiner*—Devendra T. Kumar
*Attorney, Agent, or Firm*—Frederick B. Luludis

[57] ABSTRACT

The detection of echo is enhanced using a coarse near-end speech detector at a Y-side of an echo canceler and using a more accurate near-end speech detector at the E-side of the echo canceler, such that the latter detector uses a representation of far-end speech and a threshold value to determine if the magnitude of the echo canceler output is larger than that of an echo signal only. If it is, and there is an absence of an indication of the presence of near-end speech from the coarse detector, then the more accurate speech detector adjusts the value of the threshold in a first direction, otherwise it adjusts the threshold in a second direction, to more "finely tone" such accuracy.

14 Claims, 3 Drawing Sheets ly small, then the reflected signal is typically not noticed at the source of the original signal. However, if the echo-path delay is otherwise, then the echo becomes, qualitatively, most annoying to the source, e.g., the talking party. One echo controlling device, known as an echo canceler, synthesizes an estimate of the echo signal and subtracts the estimate from an outgoing signal to effectively "cancel out" the echo signal. For example, FIG. 1 shows a transmission network, including a prior art echo canceler, coupling via hybrid 101 a bi-directional transmission path or facility 102 to a circuit arrangement including incoming unidirectional transmission path or facility 103 and outgoing unidirectional path or facility 104. Such an incoming and outgoing circuit arrangement constitutes, for example, a four-wire transmission facility.

ECHO CANCELER E-SIDE SPEECH DETECTOR

FIELD OF THE INVENTION

The invention relates to echo cancelers and the like.

BACKGROUND OF THE INVENTION

Echoes characterized by a partial reflection of an incoming signal are produced in a transmission system whenever an impedance discontinuity or mismatch exists, such as at the junction between a four-wire transmission path and a two-wire transmission path. If the so-called echo-path delay is very small, then the reflected signal is typically not noticed at the source of the original signal. However, if the echo-path delay is otherwise, then the echo becomes, qualitatively, most annoying to the source, e.g., the talking party. One echo controlling device, known as an echo canceler, synthesizes an estimate of the echo signal and subtracts the estimate from an outgoing signal to effectively "cancel out" the echo signal. For example, FIG. 1 shows a transmission network, including a prior art echo canceler, coupling via hybrid 101 a bi-directional transmission path or facility 102 to a circuit arrangement including incoming unidirectional transmission path or facility 103 and outgoing unidirectional path or facility 104. Such an incoming and outgoing circuit arrangement constitutes, for example, a four-wire transmission facility.

Accordingly, incoming voice/speech signals are supplied via unidirectional path 103 to one input of adaptive filter 106-1 of canceler 106 and one input of NES (Near End Speech) detector 106-2. They are also supplied to hybrid 101 for presentation to station S1. (It is noted that incoming voice/speech signals received from the far end via path 103 will also be referred to herein as far-end speech and denoted by x(k), such signals are supplied to station S1 via hybrid 102. Similarly, outgoing voice/speech signals received from station S1 via bi-directional path 102, hybrid 101 and unidirectional path 104 are presented to an input of Near End Speech (NES) detector 106-2 and to one input (+) of adder circuit 106-3. (It is also noted that the voice/speech signals originating at station S1 will also be referred to herein as near-end speech (NES). The sum of NES and any echo will be denoted y(k), and the signals supplied to path 105 will be denoted by e(t).) NES detector 106-2 monitors path 104 in a conventional manner to distinguish echo from NES. If such monitoring and detection indicates that NES is present on path 104, then detector 106-2 outputs an adaptation control signal which inhibits filter 106-1 from adapting to the level of echo on path 104. If, on the other hand, no NES is detected, then the inhibit signal is removed to allow filter 106-1 to adapt, in a well-known way, to the echo signal on path 104. In doing so, filter 106-1 supplies to an input (−) of adder circuit 106-3 a signal which effectively constitutes an estimate of the echo signal. Adder circuit 106-3, in turn, subtracts the estimate from the signal received via path 104 and outputs the result to unidirectional path 105 for transmission to the far-end. It can be appreciated that filter 106-1 initially outputs a coarse estimate of the echo, but through its adaptation process eventually attains finer estimates of the path 104 echo. (It is noted that a similar echo cancellation process occurs at the far-end.)

As mentioned above, NES detector 106-2 attempts to distinguish between the echoed far-end speech (FES) and direct NES supplied via unidirectional path 104. It does this by comparing an estimate of the power level of the y(k) signal with an estimate of the power level of the x(k) signal. If the estimated level of y(k) is greater than some fraction (e.g., 0.5, which corresponds to −6 dB) of the level of x(k), then NES detector 106-2 concludes that the y(k) signal contains NES and inhibits the filter 106-1 adaptation process. However, if the comparison indicates that the power level of the x(k) signal exceeds that of the y(k) signal by the predetermined threshold, then detector 106-2 concludes that the y(k) signal is pure echo and allows the adaptation process to proceed.

The foregoing process for detecting for the presence of echo is imperfect at best. The reason for this is that measured short-term speech levels depend on who is talking and what they are saying at a particular instant of time. Moreover, transmission losses in the FES and NES transmission paths also affect such measurements. This is underscored by the fact that NES detection is less reliable in applications where transmission losses in the NES path exceed the transmission losses in the FES path. This "skew" is particularly apparent in cellular networks.

SUMMARY OF THE INVENTION

The art of echo cancellation is advanced by providing a near-end speech detector which provides a "coarse" indication of whether a near-end signal y(k) contains speech and another near-end speech detector which uses that indication to dynamically control the processing of the x(k) and e(k) signals to more accurately identify when the near-end signal is pure echo.

In accord with one illustrative embodiment of the invention, a representation of the signal level of the far-end speech is derived from speech signals received from the far end. The representation and a threshold value is then used to determine if the magnitude of a signal received from a near-end source of signals is larger than that of an echo signal only. If it is, and there is an absence of an indication of the presence of near-end speech, then the value of the threshold is adjusted in a first direction, otherwise it is adjusted in a second direction, to more "finely tune" the accuracy of detecting echo.

These and other aspects of the invention are disclosed in the ensuing detailed description and corresponding drawings.

DETAILED DESCRIPTION OF THE DRAWING

DETAILED DESCRIPTION

Figure 1:
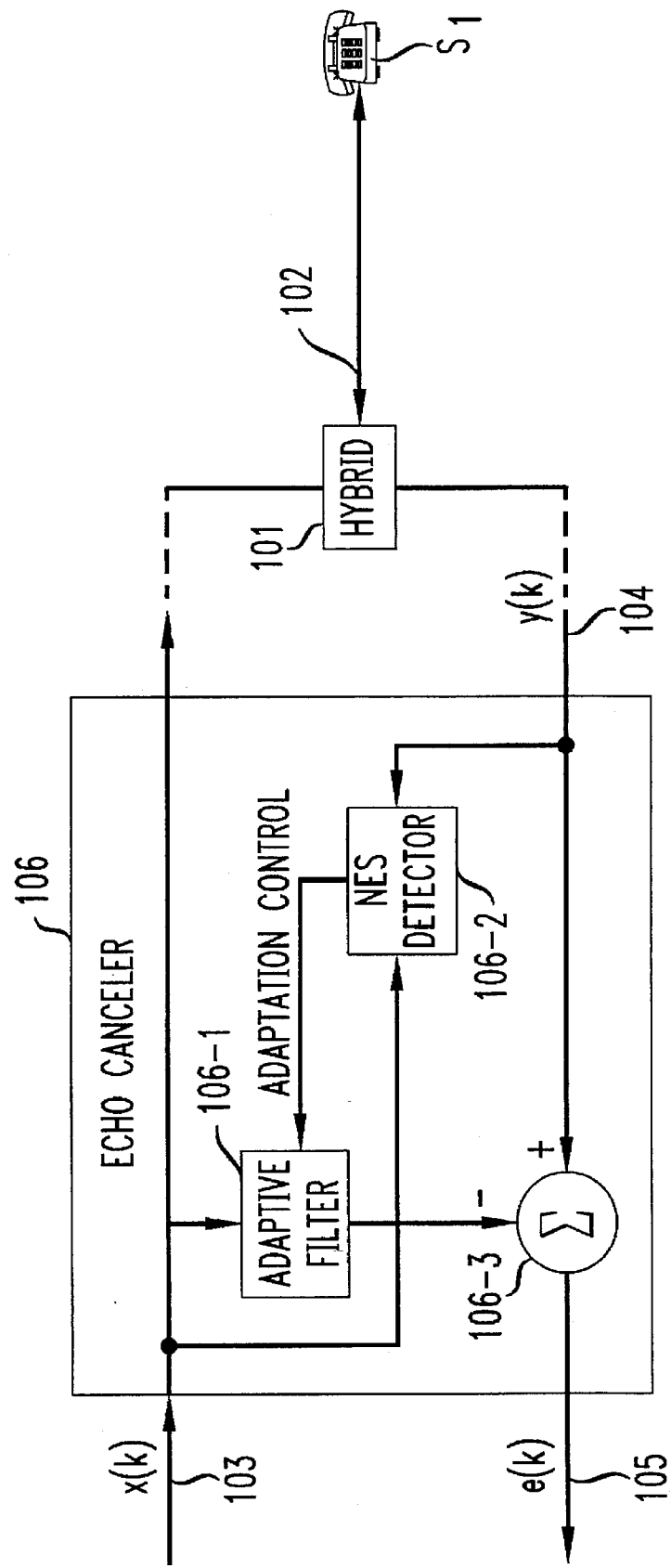
FIG. 1 is a broad block diagram of a transmission network employing an echo canceler arranged in accord with prior art teachings.
Figure 2:
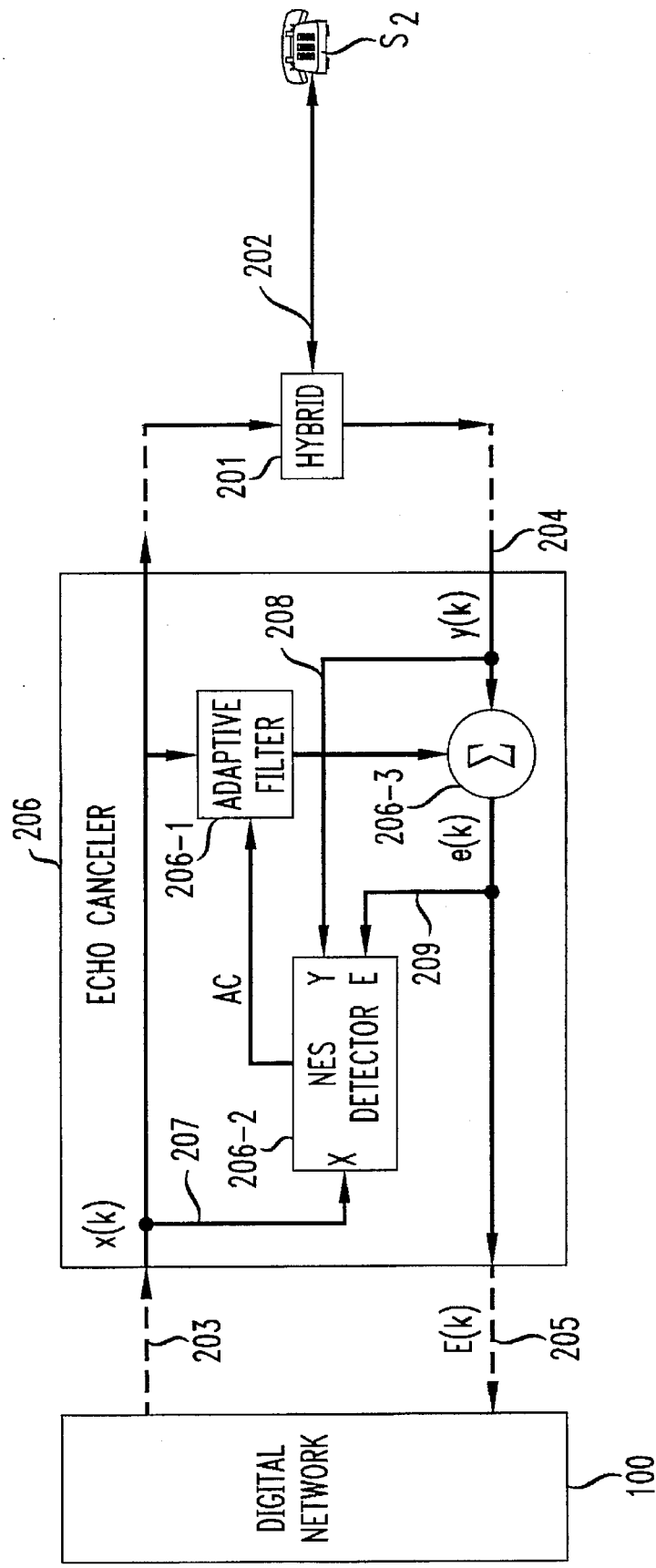
FIG. 2 is a broad block diagram of a transmission network employing an echo canceler arranged in accord with the principles of the invention.

FIG. 2 illustrates in simplified form a telecommunications connection between echo canceler 206 and a far-end digital network 100, in which the connection is composed of unidirectional paths 203 and 204. The dashed lines denote respective portions of the connections that may be of sufficient length to cause a noticeable echo path delay at the opposite ends of the bi-directional path. It is seen that echo canceler 206 includes, inter alia, an adaptive filter 206-1, which may be a conventional digital signal processor (DSP) arranged as a finite-impulse-response (FIR) filter. It also includes adder 206-3 and NES detector 206-2. NES detector 206-2, which may also be a conventional DSP, monitors unidirectional path 203 via path 207 for the presence of far-end speech signals (x(k)) and monitors unidirectional path 204 for the presence of near-end speech signals. However, unlike NES detector 106-2, FIG. 1, NES detector 206-2 also monitors, in accord with an aspect of the invention, the level of the signals present at the E-side of canceler 206 to determine if NES is present, as will be discussed below in detail.

Specifically, digital speech samples received from far-end network 100 are converted in a conventional manner (not shown) to analog signals and then supplied to hybrid 201 for delivery to station S2 via path 202. The far-end speech samples are also supplied as they are received via path 203 to the X-port of NES detector 206-2 and to an input of adaptive filter 206-1. Similarly, analog signals received from station S2 via hybrid 201 are converted in a conventional manner (not shown) into digital speech samples and then supplied to the Y-port of canceler 206 for ultimate delivery to the far end via adder 206-3 and path 205. The y(k) and e(k) signals are also respectively supplied to the Y and E ports of NES detector 206-2. NES detector 206-2 stores the x(k) samples in sequential order in an internal X-port memory buffer (not shown) composed of a predetermined number N, e.g., 512, of memory locations such that the current sample is stored in place of the oldest X-port sample stored in the buffer. Thus, NES detector 206-2 stores the latest 512 X-port speech samples in the X-port buffer in the order that they are received from the far end, e.g., network 100. Hence, the contents of the buffer represent a moving window (i.e., a shift register) that spans a predetermined period of time, e.g., 64 milliseconds, which is equivalent to the duration 512 consecutive X-port speech samples. Each time a new sample is stored in the X-port buffer, the DSP controlling the operation of NES detector 206-2 scans the contents of the buffer to locate the stored sample having the largest absolute magnitude (power level).

NES detector 206-2 then determines if NES is present based on comparing the relative level of the y(k) and x(k) signals. It is noted that different techniques for making such a determination are well known to the art. For example, the so-called Geigel algorithm is one such technique and is disclosed in the article entitled "A twelve Channel Digital Echo Canceler" by D. L. Duttweiler and published in the May, 1978 IEEE Transactions on Communications, which is incorporated herein by reference. The Geigel algorithm compares the magnitude of the current sample of y(k) that is received via path 208 with a current value of $X_{max}(k)$ as follows:

$$|y(k)| \geq \alpha_y X_{max}(k) \qquad (1)$$

where $\alpha_y$ is a predetermined value based on an expected worst-case echo path loss (often 0.5, which corresponds to −6 dB). If detector 206-2 finds that equation (1) is satisfied, then it sets a logical value $\xi_{y,big}(k)$ to true. However, the preliminary NES indication from the Y-side is not $\xi_{y,big}(k)$, but rather $$NES_y(k) = \bigcup_{n=0}^{M-1} \xi_{y,big}(k-n) \qquad (2)$$

where the hangover interval M may be, for example, 32 msec. (or 256 signal samples in a system having a clock rate of 125 microseconds). It is necessary to use $\xi_{y,big}(k)$ occurring in the recent past, rather than the most current $\xi_{y,big}(k)$, as an indication of the presence of NES because even a "powerful" NES may only create a small level of y(k) at times corresponding to zero-crossings of the speech waveform.

It may be appreciated that a Y-side speech detection algorithm, e.g., the above mentioned Geigel algorithm, may fail to detect the presence of NES in echo. This is especially the case in the face of "level skew" that occurs in digital cellular networks.

We deal with this problem, in accord with an aspect of the invention, by detecting for the presence of NES at the E-side of the echo canceler (output of the echo cancelor) and improving such detection by continually adapting an E-side threshold ($\alpha_E(k)$) downward, e.g., at a predetermined rate, until it reaches a predetermined minimum and as long as "false alarms" in the detection of NES do not occur, as will be discussed below in detail. If the value of the threshold ($\alpha_E(k)$) reaches a point where the E-side mistakenly declares NES, then the E-port detection process of NES detector 206-2 adjusts the threshold ($\alpha_E(k)$) upward, e.g., increases the value at another predetermined rate, to correct the mistake, as will also be discussed below in detail.

The E-side port of NES detector 206-2 also uses the current value of $x_{max}(k)$ to determine if speech is present at the E-side of adder 206-3 and does so by comparing the absolute value of the magnitude of the current e(k) sample that it receives via path 209 with the current value of $x_{max}(k)$ as follows:

$$\xi_{E,big}(k) = |e(k)| \geq \alpha_E(k)(x_{max}(k)) \qquad (3)$$

where the threshold $\alpha_E(k)$ is adaptively increased or decreased as mentioned above. That is, the current value of $\alpha_E(k)$ may be adaptively increased as follows:

$$\alpha_E(k) = \alpha_E(k-1)(1+\epsilon_E r_E) \qquad (4)$$

where the value of $\epsilon_E$ may be set to a value of, for example, 0.0005, and $r_E$ may be set to a value of, for example, 10.0. The value of $\alpha_E(k)$, on the other hand, may be adaptively decreased as follows:

$$\alpha_E(k) = \alpha_E(k-1)(1-\epsilon_E) \qquad (5)$$

The way in which NES detector 206-2 uses the result obtained from executing either equation (4) or (5) will be discussed below in connection with FIG. 3.

Similarly, the final E-side NES indication is declared for a hangover period (time) after $\xi_{E,big}(k)$ is first asserted, that is, as before;

$$NES_E(k) = \bigcup_{n=0}^{M-1} \xi_{E,big}(k-n) \qquad (6)$$

It is noted that this NES indication is used to inhibit the adaptation of adaptive filter 206-1 so that NES does not degrade the ability of the adaptive filter to estimate echo.

Figure 3:
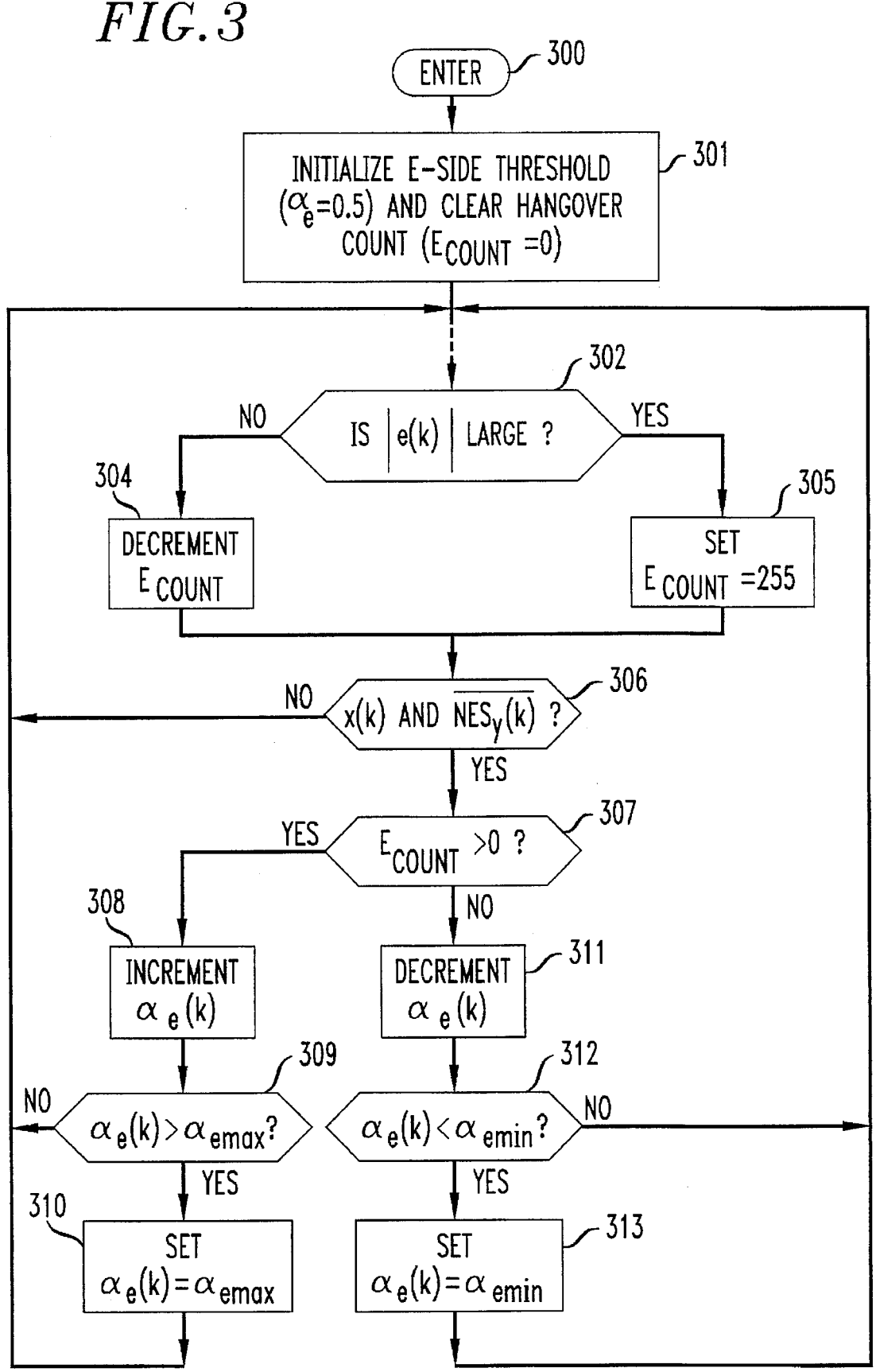
FIG. 3 illustrates in flow chart form the program that implements the principles of the invention in the NES detector of FIG. 2.

As mentioned above, NES detector 206-2 changes the threshold $\alpha_E$ in accordance with equation (4) or (5) and uses the program of FIG. 3 to control the implementation of that function. Specifically, when entered the program proceeds to block 301 where it initializes the value of the E-side threshold ($\alpha_E$) to a predetermined value (e.g., 0.5). The program then clears a so-called hangover count, $E_{count}$, to prepare for the implementation of the aforementioned hangover time. The program then waits for the receipt of a next digital sample of a far-end voice signal, x(k), as represented by the dashed line. Upon receipt of the sample, the program proceed to block 302 where it compares e(k) against the threshold determined in accord with equation (3). If the magnitude of the sample is large, then the program (block 305) sets the value of $E_{count}$ to a maximum value, e.g., 255, so that the value of $E_{count}$ (hangover time) will hold true (nonzero) for the next 255 samples of x(k). That is, the program assumes that NES is present for the next 255 samples, as will be discussed below. Otherwise, the program (block 304) decrements the value of $E_{count}$ by a predetermined value, e.g., a value of one.

Following the foregoing the program proceeds to block 306 where it (a) checks for the presence of far-end speech, x(k), and (b) the absence of an indication from the Y-port detector that near-end speech is present. It is noted that different techniques for detecting far-end speech are well-known in the art. One simple, but satisfactory algorithm for detecting far-end speech is as follows:

$$FES(k)=(X_{max}(k) \geq \alpha_{FES}) \tag{7}$$

where $\alpha_{FES}$ is set to correspond to a sinusoidal power level of approximately −42 dbmo.

The program proceeds to block 307 if it finds that FES is present and $NES_y(k)$ has not been asserted. Otherwise, it returns to await for the receipt of the next digital sample of the far-end speech signal, x(k). At block 307, the program determines in the manner discussed above whether near-end speech is still present (i.e., $E_{count}$ is not less than or equal to zero and the result of equation (3) is true ). If that is not the case, which means that the E-side detection processing agrees with the Y-port detection processing (i.e., $E_{count}$ equals zero indicating that $NES_E(k)$ is absent), then the program concludes that it may be more aggressive in the setting of threshold $\alpha_E$ to improve its detection of NES. To that end, then, the program (block 311) decreases the value of $\alpha_E$ (using equation 5). The program (block 312) then checks to see if the decrease causes $\alpha_E$ to fall below a predetermined minimum value, e.g., a value of 0.0625. If not, then the program returns to await for the receipt of the next sample of x(k). Otherwise, the program (block 313) sets the value of $\alpha_E$ to the aforementioned minimum value to prevent it from falling below that value, and then returns to await receipt of the next digital sample of x(k).

If the determination at block 307 is yes—which means that the E-side detection process does not agree with the Y-port detection process—then the program concludes that it may have been to too aggressive in the setting of $\alpha_E$. Accordingly, the program (block 308) increases the value of $\alpha_E$ in the manner described above (i.e., using equation 5). The program (block 309) then checks to see if the new value of $\alpha_E$ exceeds a predetermined maximum value, e.g., a value of 0.63, which is equivalent to −4 dB. If not, then the program returns to await receipt of the next digital sample of x(k). If so, then the program (block 310) sets $\alpha_E$ E to the maximum value to prevent it from exceeding that value and then returns likewise.

The foregoing is merely illustrative of the principles of the invention. Those skilled in the art will be able to devise numerous arrangements, which, although not explicitly shown or described herein, nevertheless embody those principles that are within the spirit and scope of the invention.

We claim:

1. An echo canceler having an adaptive filter, said echo canceler comprising an adder circuit, a first near-end speech detector, and a second near-end speech detector, said second near-end speech detector comprising, means for receiving speech signals via a connection extending to a far-end source of speech signals and for processing said received speech signals to derive a representation of the signal level of the far-end speech, means, responsive to said derivation of said signal level, for determining as a function of said representation and a current value of a threshold variable if a signal outputted by the canceler has a magnitude larger than that of an echo signal only, and means, responsive to said signal having said larger magnitude and an absence of an indication of a presence of near-end speech from said first near-end speech detector, for decreasing the value of said threshold variable, otherwise increasing the value of said threshold variable.

2. The echo canceler of claim 1 wherein said threshold value is decreased in accordance with a first predetermined rate.

3. The echo canceler of claim 1 wherein said threshold value is increased in accordance with a second predetermined rate.

4. The canceler of claim 1 wherein said near-end source is a cellular network.

5. The canceler of claim 1 wherein said first predetermined rate is less than said second predetermined rate.

6. The canceler of claim 1 further comprising means, responsive to the value of said threshold reaching a value greater than a predetermined maximum value, for setting said threshold to said maximum value.

7. The canceler of claim 1 further comprising means, responsive to the value of said threshold reaching a value less than a predetermined minimum value, for setting said threshold to said minimum value.

8. The canceler of claim 1 wherein said first near-end speech detector comprises means for forming said received speech signals into a current series of speech signals based on the order in which said speech signals are received from said far-end source, means for determining which one of the speech signals forming said series has the largest magnitude, and means for outputting said indication if a current near-end signal has a magnitude at least equal to a value derived as a function of said far-end speech signal having the largest magnitude and a predetermined threshold value.

9. A speech detector for an echo canceler, said speech detector comprising means, connected via a unidirectional communication path to a source of far-end speech signals, for receiving said far-end speech signals and deriving a representation of the far-end speech, a first speech detector operative for monitoring another unidirectional path extending to a source of near-end signals and outputting an indication whenever said near-end signals contain near-end speech, and a second speech detector for determining as a function of said representation and a current value of an adaptive threshold value, $\alpha_E$, if an output from said echo canceler has a magnitude larger than that of an echo signal only, said second speech detector further comprising means for decreasing the value of said adaptive threshold, $\alpha_E$, if (a) said indication from said first speech detector is absent and (b) said current near-end signal has said larger magnitude, and increasing the value of said adaptive threshold if condition (a) or (b) is otherwise.

10. The speech detector of claim 9 wherein said far-end source is a cellular network.

11. The speech detector of claim 9 wherein said increasing and decreasing of said adaptive threshold, $\alpha_E$, is done in accordance with respective first and second predetermined rates not equal to one another.

12. The speech detector of claim 9 further comprising means, responsive to the value of said threshold, $\alpha_E$, being greater than a predetermined maximum value, for setting said threshold to said maximum value.

13. The speech detector of claim 9 further comprising means, responsive to the value of said threshold, $\alpha_E$, being less than a predetermined minimum value, for setting said threshold to said minimum value.

14. A method of operating an echo canceler, said echo canceler including an adaptive filter, adder circuit and first and second near-end speech detectors, said method comprising the steps of receiving speech signals via a connection extending to a far-end source of speech signals and processing the received speech signals to derive a representation of the signal level of the far-end speech, at said second near-end detector, responsive to the derivation of said signal level, determining as a function of said representation and a current value of a threshold variable if an output from said echo canceler has a magnitude larger than that of an echo signal only, and at said second near-end detector, responsive to said signal having said larger magnitude and an absence of an indication of a presence of near-end speech from said first near-end speech detector, for decreasing the value of the threshold variable, otherwise increasing the value of the threshold variable.

* * * * *